March 3, 1936.  A. C. NELSON ET AL  2,032,628
AIR HEATER AND CIRCULATOR FOR HOP DRIERS AND THE LIKE
Filed June 16, 1934   2 Sheets-Sheet 1
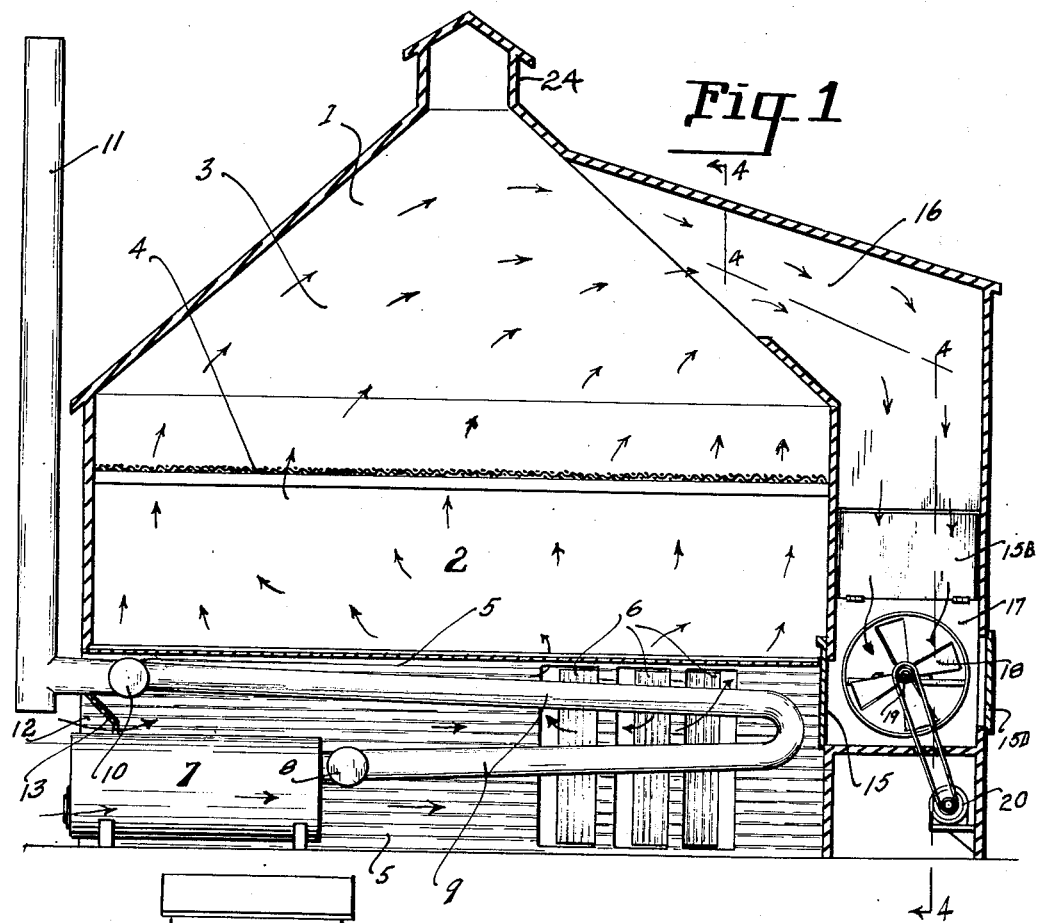
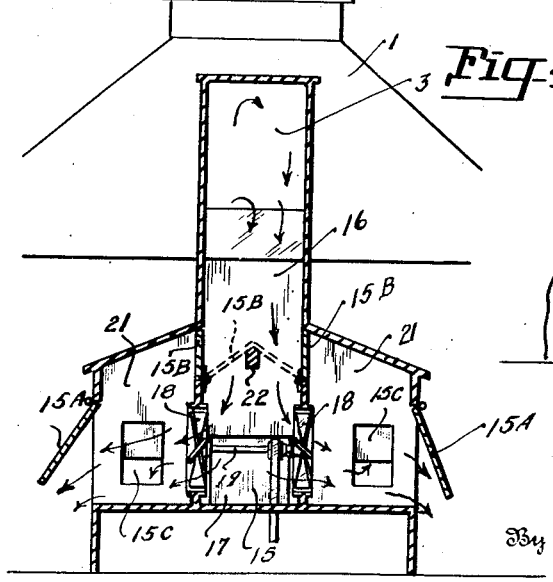
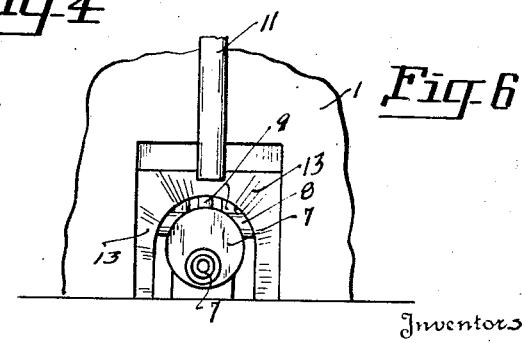
Inventors
Adolph C. Nelson
Ronald T. Frizzell March 3, 1936.  A. C. NELSON ET AL  2,032,628
AIR HEATER AND CIRCULATOR FOR HOP DRIERS AND THE LIKE
Filed June 16, 1934   2 Sheets-Sheet 2
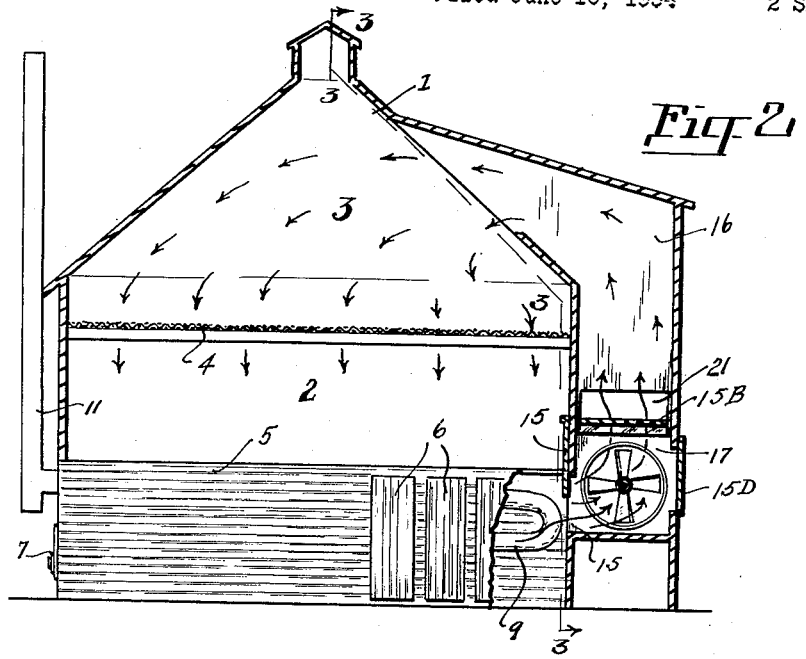
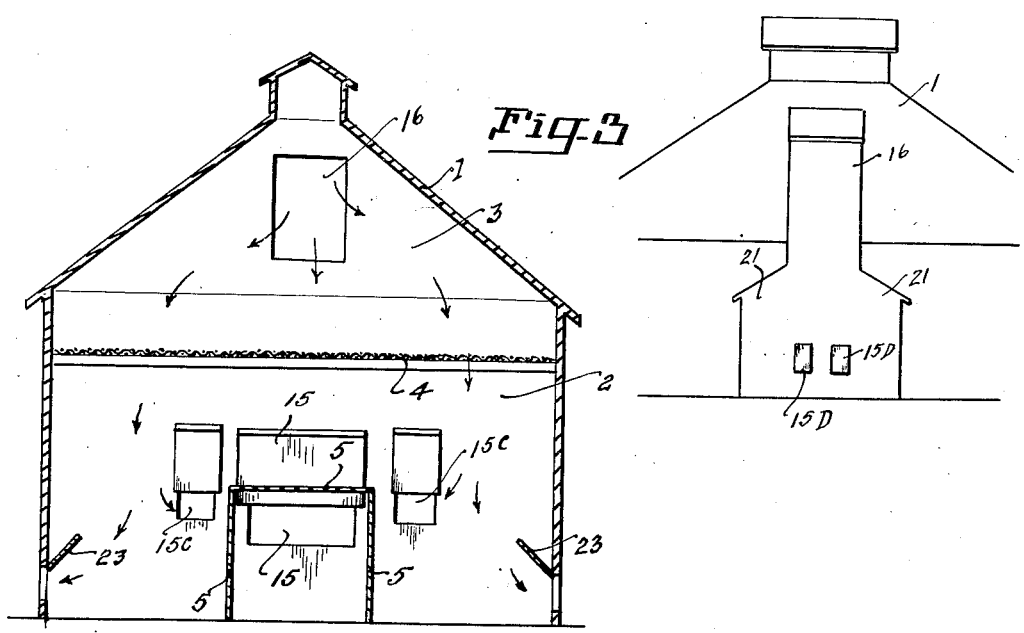
Inventors
Adolph C. Nelson
Ronald T. Frizzell
Attorney Patented Mar. 3, 1936

2,032,628

UNITED STATES PATENT OFFICE 2,032,628

AIR HEATER AND CIRCULATOR FOR HOP DRIERS AND THE LIKE

Adolph C. Nelson and Ronald J. Frizzell, Salem, Oreg.

Application June 16, 1934, Serial No. 730,924

5 Claims. (Cl. 34—19)

Our invention relates to improvements in an air heating and circulation system for dry houses, kilns and the like and the mechanism and apparatus for attaining such ends. Essentially our invention concerns itself with the production and conservation of heated air to be used as a drier and moisture absorbent agent in dry houses, kilns and the like. To this end our invention provides first, an improvement in means for heating air whereby the entirety of a flow of normal air is evenly and expeditiously heated; and second, an improvement in means for utilizing and controlling such heated air whereby heat losses occasioned through immovability, stagnation and inertness may be reduced to a minimum, and practically the entirety of such heated air is made to serve a useful purpose.

While upon reading the description of our invention which is included herewith it will be apparent that our invention is not limited to a particular use and we do not wish to have it to be understood that it is so limited, we do believe, however, that it is particularly suitable for curing or drying hops, and so in order to adequately explain and describe its construction and operation we here concern ourselves to its adaptation to such purposes.

As is well known in the art, one of the greatest problems presented to operators of hop drying houses or kilns, has been and is the production of adequate heat with which to dry or cure hops, and the control of such heat in order that the greatest number of heat units may be utilized for the drying or curing process. In the simpler drying processes two rooms are utilized, one above the other separated by lattice or other perforate flooring. A stove or other heating unit is provided in the lower room, being used to heat the air content thereof, which air when heated rises through the perforate flooring absorbing the moisture content and drying the hops spread thereupon, and thereafter escaping through ventilators in the roof over the upper room. Advances over this simple art have been directed to improvements in heating means and in means for circulating the heated air.

As before indicated, our invention resides in improvements in a heat generating or air heating apparatus, and in improved means for circulating heat or heated air through a kiln house. Essentially our invention embodies a heating element or stove enclosed in an elongated manifold or metallic tunnel open at one end for entry of normal air which passes between the inner walls of the manifold and the stove where as it passes or flows becomes thoroughly heated. Both stove and manifold are situated in the lower or heat chamber where the radiant qualities of the manifold, by reason of its metallic struction, heats the interior of such chamber. In addition to the radiant heating qualities of the manifold, it is also provided with louvres or gates for movement of heated air from its interior into the heat chamber of the dry house, thus not only heating the natural air content of such chamber, but also adding heated air thereto. By reason of the fact that air entering the heat chamber is in a highly heated condition, cold or low temperature regions are practically eliminated, thus ensuring that air passing through all portions of the perforate floor above into the dry chamber is sufficiently heated to perform the purpose for which it is intended.

In connection with the heating apparatus we employ means for thoroughly circulating the heated air through the dry room. This means is so operative that heated air may be withdrawn directly from the manifold and forced into the heat chamber thereby compelling it to pass into the dry chamber from whence it can either be returned to the heat chamber or exhausted exterior thereof; or the used air in the dry chamber may be exhausted thus inducing a flow of heated air from heat chamber to dry chamber; or the used air of the dry chamber may be returned to the heat chamber for reheating and then to the dry chamber, and so on making repeated circuits from one chamber to the other; or the used air may be withdrawn from the dry chamber and cold air introduced in order to reduce temperature sufficiently to permit workers to enter and replace dried produce with those to be dried.

Concisely stated the objects of our invention are as follows: the provision of a more efficient heating system for drying houses and kilns; the provision of a more efficient heat distribution system for drying houses and kilns; the provision of a more efficient heat circulation system for dry houses and kilns; and such other and further objects as shall appear upon reading the following description, aided by the accompanying drawings, wherein—

Figure 1 is a side sectional elevation of a hop drying house showing our invention installed therein.

Figure 2 is a side sectional elevation of a hop drying house, and a side elevation with portions broken away of the heat manifold or tunnel.

Figure 3 is an interior end sectional view of a hop drying house illustrating portions of the invention.

Figure 4 is an exterior fragmentary end sectional elevation of a hop drying house and particularly illustrates the heat circulation system.

Figure 5 is an end elevation of a portion of a hop drying house illustrating a portion of the heat conduit.

Figure 6 is an end elevation of the heating system.

In the drawings 1 indicates a hop drying house having a lower heat room 2 and thereabove a dry room 3 separated by a suitable perforate floor 4 which permits heated air to travel from the lower to the upper room. Extending lengthwise of room 2 is a heat manifold or tunnel 5. Manifold 5 is shown extending the entire length of the lower room from the front wall to the rear. While its construction may be altered under certain circumstances to permit particular installations, ordinarily a manifold having a rectangular cross section will be found most adaptable for the purpose. Opposite sides of the manifold, and proximate its rear end are provided with a number of gates or louvres 6 which permit a passage from manifold to chamber 2 when opened. A stove 7 or other suitable heating member is situated in the forward end of the manifold, such forward end being left open to the exterior. The smoke exhaust of stove 7 connects with a header 8 with which connect a number of exhaust pipes 9 which extend at an upwardly inclination to the rear end of the manifold and thence curve back to the front end where they connect with a second header 10, from which leads a smoke exhaust stack 11.

In operation the stove 7 is heated to a high degree. Air enters the front end 12 of the manifold between it and such stove and by reason of the intense heat of the stove the air is heated, receiving further heat from the pipes 9. The hot air in the manifold, unless otherwise directed as will hereinafter be understood, may be permitted to escape through gates 6 into chamber or room 2, and from there passing through floor 4 into room 3 above. In order to direct the incoming air toward the stove 7 a suitable number of deflectors 13 are provided, and these deflectors being placed diagonally to the inwardly moving air current deflect such current toward the stove 7.

The rear end of the manifold 5 abuts the rear end 14 or wall of house 1 and in order to permit exit of heated air therefrom a gate or valve 15 is provided. Gate 15 provides for the passage of air from manifold directly to a fan chamber.

In order to realize the greatest benefits from air heated in the manifold we provide a cooperating air circulation system whereby the heated air may be drawn directly from the lower heat room through products drying on floor 4 into the upper room and exhausted; or either continuously from the upper room to the lower, or the lower to the upper; or the warm air may be withdrawn from the upper room to allow entry of cold air; and so forth. This consists of a main air duct 16 leading from upper room 3 downwardly exterior of the house 1, and terminates in a fan chamber 17, which chamber optionally communicates with the manifold by means of gate 15. In opposite side walls of fan chamber 17 are mounted fans 18 on shaft 19 and operated by suitable means such as motor 20. The vanes of fans 18 are arranged to force air outwardly from the fan chamber 17. At each side of the fan chamber, placed so that the exhausts of fans 18 will enter thereinto are bypass chambers 21. Chambers 21 have gates 15a which may be opened to the exterior to allow discharge of air current created by fans 18. Chambers 21, at the upper ends, communicate with passageway 16 when gates 15b are opened, the latter gates when opened assuming the position indicated by dotted lines 15b in Figure 4 rest upon stringer or support 22 and closing communication directly between duct 16 and chamber 17. Gates 15c, which may be opened or closed at will provide for communication between chambers 21 and heat room 2, and gates 15d permit optional communication between fan chamber and the exterior.

To aid in the entry of cold air to heat room 2, when required, vent gates 23 are provided along the bottom walls of the walls, and a ventilator to allow escape of warm air may be provided.

The operation of our invention is as follows. Assuming that stove 7 is heating properly, cold air enters the manifold at 12 being deflected toward the stove by members 13, becomes heated and passes through doors or gates 6 into lower chamber 2. At the same time fans 18 are operating and draw air from room 3 through duct 16 into chamber 17, and discharge such air through chambers 21 and open gates 15a to the exterior. As air is withdrawn from the upper chamber the heated air in the lower chamber rises through perforate floor 4 into the upper chamber. If during this upward movement of heated air through the floor, a product such as hops is spread thereupon, the upwardly moving air will come in contact and act as a drying agent. In some instances it may be desirable to return the air withdrawn from the upper chamber to the lower chamber and this may be done by closing gates 15a and opening gates 15c so that the air leaving chambers 21 reenters the lower heat chamber 2.

Again it may be found desirable to have a reverse circulation of warm air, that is to say, to conduct the warm air directly to the upper chamber and cause it to pass downwardly into the lower chamber. This can be done by closing gates 6, opening gate 15 to chamber 17, closing gates 15a and 15c and opening gates 15b to the dotted position in Figure 4. The warm air then travels from the manifold through gate 15 into chamber 17, is forced from there into chambers 21 and thence through open gates 15b into duct 16 and into chamber 3. This will allow the warm or heated air to come in contact first with the top of the products being dried. The warm air passes through the products into chamber 2 and out through vents provided by opening gates 23.

In order to change the products being dried on floor 4 it will be found desirable to cool the upper chamber 3 to permit workers to enter. This may be done by closing gates 6, 15, 15a, and 15c and opening gates 15d and 15b. Cold air is drawn through gates 15d into chamber 17 thence into chamber 21 and through open gates 15b into duct 16 to chamber 3. Or in the last operation gates 15b may be closed and gates 15c opened then the cold air would pass from chambers 21 through gates 15c into chamber 2 thence through perforate floor 4 into room 3 where it may be exhausted through a suitable gate in cupola 24. Or again gates 6 to the manifold can be closed and vents 23 opened to room 2, and then the warm air can be withdrawn and discharged from the upper room as previously explained.

From the foregoing description it will be seen that absolute control has been gained of air circulation, whether heated or normal. This control of the air in connection with the air heating system used in connection therewith provide a most efficient means for drying or curing hops and the like.

While a specific form of the improvement has been described and illustrated herein, it is desired to be understood that the same may be varied, within the scope of the appended claims, without departing from the spirit of the invention.

Having described our invention, we claim—

1. In a dry house having a lower heat room and an upper dry room separated by a perforate floor, an air heating and circulation system therefor including a heater, a manifold extending into the heat room in which said heater is located and its interior constituting an air heating chamber, gates permitting the heated air in said manifold to pass directly to the heat chamber, an air circulation system connected to one end of said manifold including by-pass chambers and control gates operable to direct the flow of warm air from the heat room and manifold upwardly through the perforate floor to the dry room and then to the exhaust; from the manifold directly to the dry room through the perforate floor to the heat room; or to direct cold air into the dry room as may be desired.

2. In a dry house having a lower heat room and an upper dry room separated by a perforate floor, an air heating and circulation means therefor including a heater, a manifold heated by the heater, the manifold being located within the heat room and having one end opening through the wall thereof to the exterior and the interior thereof constituting an air heating chamber, a duct communicating between the two rooms and the manifold and provided with by-passes and control gates including control gates in the manifold providing for passage of heated air from manifold to heat room, said gates being operable to direct the flow of warm air from heat room and manifold upwardly through the perforate floor to the dry room and then to exhaust; from the manifold directly to the dry room through the perforate floor to the heat room; or to direct cold air into the dry room as may be desired.

3. In a dry house having a lower heat room and an upper dry room separated by a perforate floor, an elongated air heating chamber within the heat room, said chamber having one end open to the exterior, an air conduit communicating with both rooms and said heating chamber, including by-passes therein, gates controlling the circulation or flow of air through the conduit, to the heat room, to the exterior, to the heating chamber and from the heating chamber to the heat room and operable when certain gates are opened and certain closed to direct the circulation of heated air from the heat room to the dry room or vice versa; from the heating chamber to the dry room and then to the exterior; from the heating chamber to the heat room to the dry and then to the exterior; or from the exterior to either or both the heat room and the dry room.

4. In a dry house having a lower heat room and an upper dry room separated by a perforate floor, an air heating and circulation means therefor including a heater, a casing heated by the heater, said casing being an elongated member located entirely within the heat room and positioned beneath the perforate floor, one wall of the heat chamber having an opening from the exterior to the interior of the casing and the heater being located in said casing proximate such opening and the casing constituting an air heating chamber, a duct communicating between the two rooms and the casing provided with by-passes and control gates including control gates in the casing providing for passage of heated air from casing to heat room, said gates being operable to direct the flow of warm air from heat room and casing upwardly through the perforate floor to the dry room and then to exhaust; from the casing directly to the dry room through the perforate floor to the heat room; or to direct cold air into the dry room as may be desired.

5. In a dry house having a lower heat room and an upper dry room separated by a perforate floor and an air heating means positioned in the heat room immediately below the perforate floor, means for circulating air directly from the exterior to either room and for controlling the direction of the circulation of warm air between the two rooms through the perforate floor embodying a duct communicating between the two rooms, said duct having by-passes, fans for directing the flow of air from the duct to the by-passes, and gates in the by-passes and the duct proper communicating between the by-passes and the exterior, the by-passes and the heat chamber, the duct and the exterior, the duct and the heating means, and the by-passes and the duct.

ADOLPH C. NELSON.
RONALD J. FRIZZELL.